United States Patent [19]

Nakagawa et al.

[11] Patent Number: 5,502,967
[45] Date of Patent: Apr. 2, 1996

[54] COLOR VARIATION INDUCING DEVICE

[75] Inventors: Tanehiro Nakagawa; Tsutomu Tomatsu, both of Nagoya; Yoshiaki Ono, Gifu, all of Japan

[73] Assignee: The Pilot Ink Co., Ltd., Nagoya, Japan

[21] Appl. No.: 300,592

[22] Filed: Sep. 2, 1994

Related U.S. Application Data

[63] Continuation of Ser. No. 856,695, Mar. 24, 1992, abandoned.

[30]  Foreign Application Priority Data

| Mar. 28, 1991 | [JP] | Japan | 3-091133 |
| Mar. 29, 1991 | [JP] | Japan | 3-092933 |
| Mar. 29, 1991 | [JP] | Japan | 3-092934 |
| Apr. 30, 1991 | [JP] | Japan | 3-128439 |
| Aug. 21, 1991 | [JP] | Japan | 3-233917 |
| Sep. 20, 1991 | [JP] | Japan | 3-270370 |
| Oct. 23, 1991 | [JP] | Japan | 3-305410 |

[51] Int. Cl.⁶ .................................................. F25B 21/02
[52] U.S. Cl. .............................. 62/3.3; 62/3.2; 219/216; 219/229
[58] Field of Search .............................. 62/3.3, 5.2, 3.62, 62/293; 132/118; 128/742; 219/216, 229

[56]  References Cited

U.S. PATENT DOCUMENTS

| 1,592,148 | 7/1926 | Munn . | |
| 3,093,135 | 6/1963 | Hirschhorn | 62/3.2 |
| 3,130,553 | 4/1964 | Makow | 62/3.62 |
| 3,412,566 | 11/1968 | Townsend et al. | 62/3.2 |
| 3,987,493 | 10/1976 | Johnson et al. | 346/139 C |
| 4,028,118 | 6/1977 | Nakasuji et al. | 106/21 |
| 4,176,273 | 11/1979 | Fujie et al. | 219/220 |
| 4,305,223 | 12/1981 | Ho | 446/484 |
| 4,308,013 | 12/1981 | Major | 62/3.2 |
| 4,384,989 | 5/1983 | Kamgaito et al. | 252/62.3 |
| 4,421,560 | 12/1983 | Kito et al. | 106/21 |
| 4,720,301 | 1/1988 | Kito et al. | 106/21 |
| 4,725,462 | 2/1988 | Kimura | 428/29 |
| 4,818,215 | 4/1989 | Taga | 431/126 |
| 4,917,643 | 4/1990 | Hippely et al. | 446/14 |
| 4,920,991 | 5/1990 | Shibahashi et al. | 132/73 |
| 5,011,445 | 4/1991 | Nakasuji et al. | 446/14 |
| 5,040,381 | 8/1991 | Hazen | 62/3.2 |
| 5,079,049 | 1/1992 | Kito et al. | 428/24 |
| 5,085,607 | 2/1992 | Shibahashi et al. | 446/14 |

OTHER PUBLICATIONS

Patent Abstracts of Japan, vol. 12, No. 79 (62-215982) Mar. 12, 1988.

*Primary Examiner*—John M. Sollecito
*Attorney, Agent, or Firm*—Fitzpatrick, Cella, Harper & Scinto

[57]  ABSTRACT

A color variation inducing device is positioned in contact with or in the proximity of or effects action through air blowing means on a thermally color-varying article provided with a thermally color-varying layer, thereby inducing color variation in the thermally color-varying layer. The device comprises an electrothermal converter device provided with a heat absorbing portion and a heat generating portion based on Peltier effect, a radiator connected to the heat generating side of the electrothermal converter device, and a casing for housing and supporting the electrothermal converter device, wherein the electrothermal converter device is rendered functionable under the application of a DC voltage in such a manner that the heat absorbing side thereof exhibits a temperature reduction of at least 3° C. with respect to the ambient temperature, within an ambient temperature range from 10° to 35° C.

8 Claims, 10 Drawing Sheets

COLOR VARIATION INDUCING DEVICE

This application is a continuation of application Ser. No. 07/856,695, filed Mar. 24, 1992, now abandoned.

BACKGROUND OF THE INVENTION

1. Field of the Invention

The present invention relates to a color variation inducing device, and more particularly to such device capable, under application of a low voltage, of inducing color variation in a thermally color inducing article bearing a thermochromic layer thereon, by positioning in contact with or in the proximity of said article or by action through air blowing means.

2. Related Background Art

As means for inducing color variation in a thermally color-varying or thermochromic article, the Japanese Patent Application Laid-open No. 62-101598 proposed a configuration of providing a conductive heat-generating member on the rear face of a thermochromic sheet and inducing a color variation in the image formed on said sheet by electric current heating. Also the Japanese Utility Model Application Laid-open No. 62-139573 proposed a configuration of bringing an electric heating utensil, equipped with a heating resistor such as of tungsten or nickel, into contact with a thermally color varying material formed on the surface of an animal toy or the like, thereby inducing a color variation in thus contacted area.

Although there have been made certain proposals on heating means for inducing color variation in the thermally color-varying layer as cited above, no effective cooling means has been disclosed for inducing color variation by cooling in thermally color-varying layer, and the color variation by cooling has had to be achieved by a cooling medium such as cold water or ice pieces, or by keeping the thermally color varying article in a refrigerator for utilizing the cold air therein.

Such cooling means may be applicable in certain specified places such as in home, but are unable to immediately induce color variation in the thermochromic layer of the article whenever necessary regardless of the place, so that the function of the thermally color-varying article having a color varying point in a low temperature range could not be effectively exploited.

Also the above-mentioned cooling media, being limited in duration of coldness, require a cumbersome preparatory operation each time. Furthermore, the thermally color-varying articles not resistant to water are often deteriorated by dews, waterdrops or leaking water, not only in the direct contact of said cooling medium but also in the indirect contact with a container holding said cooling medium therein.

SUMMARY OF THE INVENTION

An object of the present invention is to provide a color variation inducing device which is free from the aforementioned drawbacks of the conventional cooling means and is capable of inducing color variation in the thermally color-varying layer by cooling in arbitrary time and location, also satisfying portability, immediateness of function, duration of coldness, convenience of use etc., and also to provide such device capable of both cooling and heating by switching the polarity of the applied voltage.

Another object of the present invention is to provide a color variation inducing device capable of effectively exhibiting its effect in a combination with a heating device consisting of a heating element employing a heating resistor with temperature self-controlling function.

Still another object of the present invention is to provide a color variation inducing device enabling diversification of merchadise and applications to various fields, in combination with a thermally color-varying system provided with a thermally color-varying layer based on a coloring material containing a color-memorizing thermochromic dye (which changes color by temperature with a large hysteresis, has two color-varying points at a high temperature and a low temperature, is reversible between colored and uncolored states or between two different colored states, can be changed to a state different from the normal state by the application of temperature lower than said low color-varying point or higher than said high color-varying point, and can reversibly retain said different state at the normal temperature range), thereby effectively exploiting the function of said color-memorizing heat-sensitive dye.

DETAILED DESCRIPTION OF THE PREFERRED EMBODIMENTS

Figure 1:
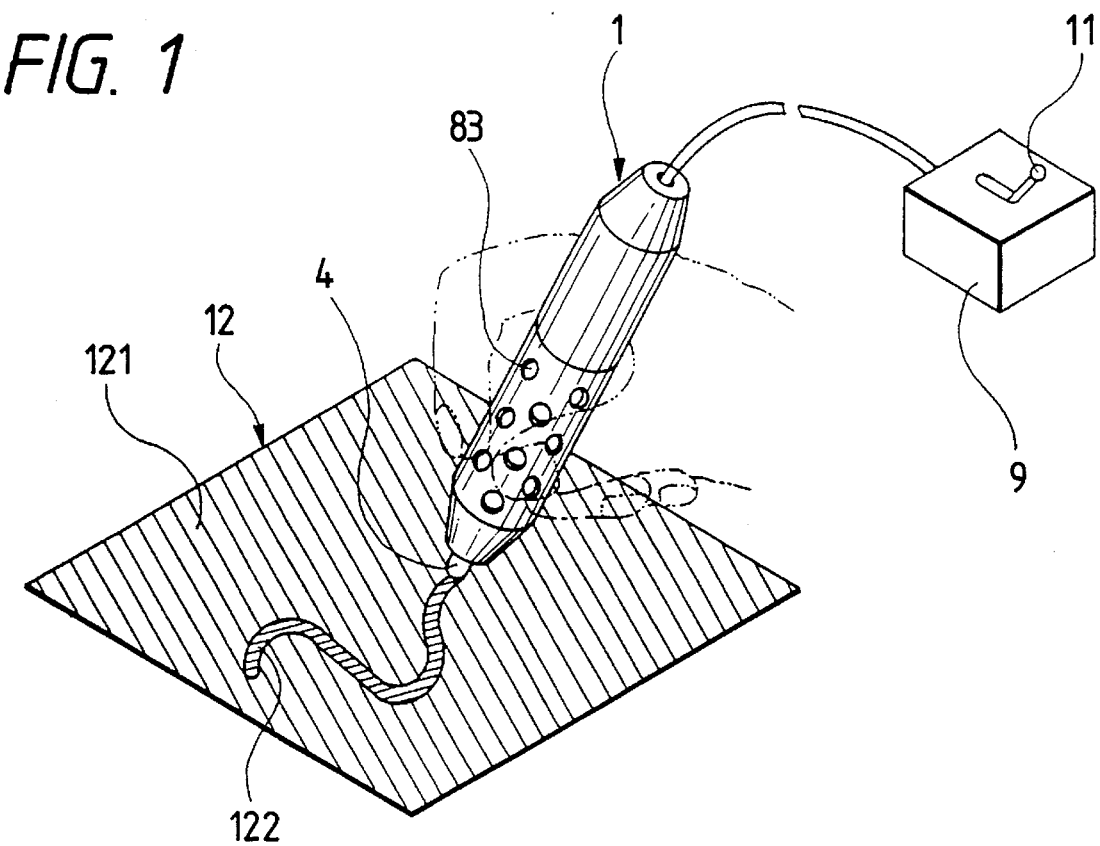
FIG. 1 is an explanatory view of an embodiment of a color variation inducing device according to the invention.

Now the color variation inducing device of the present invention will be explained in greater detail, with reference to the attached drawings.

The color variation inducing device 1 of the present invention, for inducing color variation in a thermally color-varying layer 121 by positioning in contact with or in the proximity of a thermally color-varying article 12 provided with said layer 121, or by action through air blowing means, is provided with an electrothermal converter device 2 with Peltier effect, having a unit structure in which P-semiconductor elements 21 and N-semiconductor elements 22 are alternately connected by metal pieces 23 and are sandwiched between heat-conductive insulating plates 24; a radiator 3 connected to the heat generating side B of said electrothermal converter device 2; and a casing 8 housing and supporting said electrothermal converter device 2, wherein said device 2 is operable under the application of a DC voltage in such a manner that the heat absorbing side A exhibits a temperature reduction of at least 3° C. with respect to the ambient temperature, within an ambient temperature range of 10°–35° C. Furthermore, said color variation inducing device is capable of both heating and cooling, by inverting the polarity of the DC current supplied to the electrothermal converter device 2 (by adding a selector switch or inverting the direction of battery) thereby interchanging the heat absorbing side A and the heat generating side B.

Figure 24:
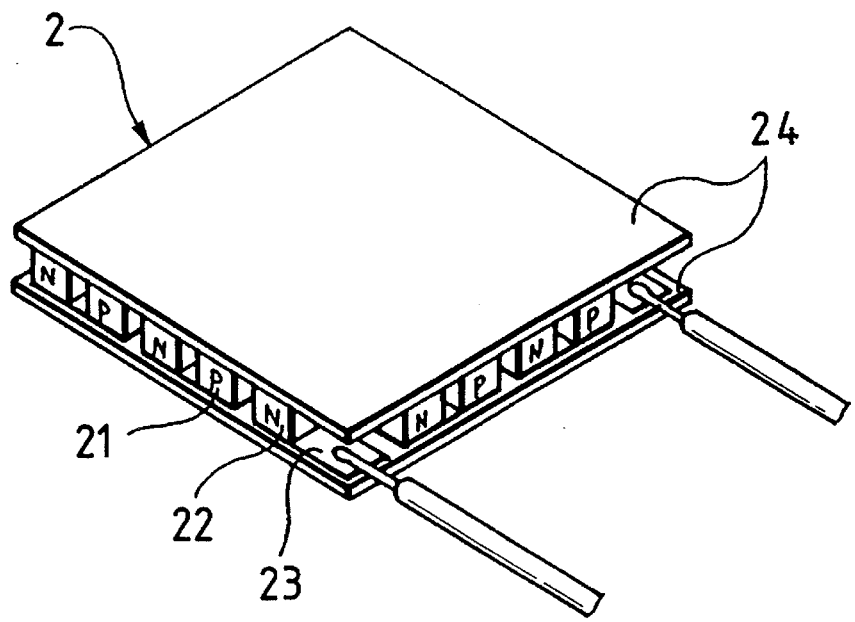
FIG. 24 is a perspective view an electrothermal conversion element to be adopted in the cooling type color variation inducing device according to the invention.
Figure 25:
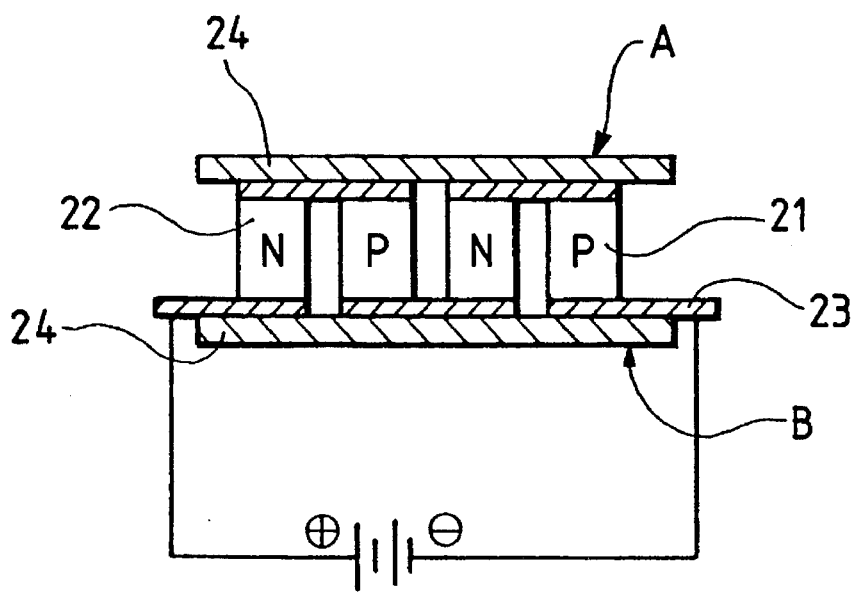
FIG. 25 is an explanatory view of the structure and the operation of the electrothermal conversion element to be adopted in the cooling type color variation inducing device of the invention.

The above-mentioned electrothermal converter device 2 with Peltier effect can be those conventionally used, and is constructed as a unit in which couples each consisting of a semiconductor element of electron deficient (P) type and that of electron excessive (N) type are alternately connected with metal pieces 23 and are sandwiched at the upper and lower surfaces with heat-conductive insulating plates 24. When a current is given from the N-terminal to P-terminal, heat absorption at the upper face A and heat generation at the lower face B take place by the Peltier effect (cf. FIGS. 24, 25).

Examples of the material constituting said P- or N-semiconductor element include $Bi_2Te_3$, $Bi_2Se_3$ and $Sb_2Te_3$.

The number of pairs of said semiconductor elements is effectively in a range of 1 to 511 pairs, preferably 4 to 127 pairs, and more preferably 4 to 31 pairs.

The radiator 3 connected to the heat generating side B (which can also be converted to the heat absorbing side by polarity switching) is required to have a heat radiating capacity of 0.1° to 150° C./W in heat resistance. A system with a heat resistance exceeding 150° C./W cannot exhibit an enough heat resistance less than 0.1° C./W is difficult to design and manufacture.

The measurement and calculation of the heat resistance of the radiator 3 are conducted in the following manner.

The heat generating surface of the electrothermal converter device 2 releases heat W3 per unit time into the air through the radiator 3. The heat W3 is the sum of electric power W1 (voltage×current) applied to the electrothermal converter device 2 and absolute heat W2 absorbed per unit time through the cooling surface:

$$W3=W1+W2.$$

The thermal resistance Rth in the present application is calculated by:

$$Rth=(T-Tr)/W3$$

wherein T is the temperature at the center of the contacting surface between the electrothermal converter device 2, and Tr is the room temperature. T and Tr are measured in degrees in Celcius, and W1, W2 and W3 are measured in watts. The room temperature Tr is maintained within a range of 10° to 35° C.

The DC voltage applied to the electrothermal converter device 2 is generally in a range of 0.1 to 50 V. A system requiring a voltage lower than 0.1 V is difficult to operate with a battery, while a system requiring a voltage higher than 50 V requires a corresponding increase in the number of couples. Such system becomes expensive for applications to consumer products such as toys, teaching aids, writing utensils etc. and can only be used for special applications. In general preferred is the use of an electrothermal converter device 2 functioning with a voltage application of 0.2 to 20 V.

In order to extend a battery life or make the use of a battery with a smaller capacity possible, a proper resistor may be provided in series with the electrothermal converter device 2.

Examples of the radiator 3 satisfying the above-mentioned requirement include heat-radiating metal fins and a wound metal mesh sheet.

Also said radiator may be composed of a heat-radiating container 31 and a heat accumulating medium 32 which fills said container at least at the use, wherein the expected heat radiating function is achieved effectively by the cooperation of these two components. A thin plastic container may be employed as said heat-radiating container 31, but at least a face in contact with the insulating plate 24 (heat generating side) of the device 2 is composed of a metal, in order to improve heat transmission to the heat accumulating medium 32 filled in said container. More effective is a metal container, composed for example of aluminum, copper or brass. The heat accumulating medium 32 is composed of liquid, preferably of a relatively low viscosity in consideration of the convection effect. Water is the optimum medium, in consideration of a large heat capacity per weight or volume, availability, safety and cost. A polyvalent alcohol for antifreezing and an antirusting agent may be added in suitable amounts. Examples of such liquid medium other than water include glycerine, ethyl alcohol and ammonia water.

In the above-mentioned system, the heat absorbing side A exhibits a temperature reducing function of at least 3° C., more specifically 3° to 40° C. (preferably 10° to 25° C.) with respect to the ambient temperature, within an ambient temperature range of 10° to 35° C.

A temperature reduction less than 3° C. is insufficient for achieving the expected color variation inducing effect, in consideration of the eventual variation in the ambient temperature. Also a temperature reduction exceeding 40° C. is impractical because of water vapor freezing.

A heat transmission member 4, provided at the heat absorbing side (plate 24) of the electrothermal converter device 2 may be composed not only of a metal but also of a thin member of rubber, plastics or ceramics.

Said heat transmission member 4 can be formed as a writing or coating tip, a stamp or a circular or polygonal shape according to the application, or as a toy element such as a comb for doll or a make-up article. In case said heat transmission member 4 is composed of metal, a portion thereof coming into contact with the thermally color-varying layer 121 may be treated with silicone resin or fluorinated resin for improving the slidability, or may be covered with a porous material with continuous pores and impregnated with water, in order to attain soft touch and smooth coating ability.

A power source 10 for applying said voltage may be integrally incorporated in the casing 8 of the color variation inducing device 1, or may be formed as a separate unit connected to said device through a cord or the like. Said power source can be composed of various batteries such as a dry battery, or can incorporate an AC/DC converter for converting AC power into a DC voltage.

In case the heat absorbing side A is changed to the heat generating side by polarity switching, said heat generating side is so designed as to exhibit a temperature increase of 3° to 60° C., preferably 5° to 50° C., with respect to the ambient temperature, within an ambient temperature range mentioned above.

The function of the present invention can be more effectively exhibited by the combination of the above-explained cooling device with a heating element equipped with a conductive heat-generating member.

A conductive heat-generating member 13 is composed of a thermistor which shows a positive temperature coefficient of electrical resistance at least within a temperature range of 25° to 70° C., generates heat under a voltage application of 0.8 to 50 V and can be self-controlled at an arbitrary temperature within the above-mentioned range.

Said heating element may be provided at the opposite end of a shaft bearing the aforementioned cooling element, thereby constituting an electrical color variation inducing device capable both heating and cooling, or may be used for constituting a separate electrical heating device which is used as a set in combination with the cooling device of the present invention.

Said heat-generating member 13 can be composed, for example, of a sintered material based on $BaTiO_3$ (rendered semiconductive by doping with a rare earth metal, eventually with substitution with Sr or the like), a material based on monocrystalline silicon, or an organic plastic material (low-melting crystalline plastic material blended with conductive power such as graphite), and the above-mentioned sintered $BaTiO_3$ is preferred in consideration of adjustment of heat saturation temperature in the low temperature range (25° to 70° C.) and temperature elevation characteristics.

Said heat-generating member 13 may be formed suitably as a disk, a band, a honeycomb according to the purpose.

In the following there will be explained the characteristics of the electric heat-generating member 13 to be employed in the present invention.

Said heat-generating member 13 is required to show a positive temperature coefficient of the electrical resistance at least in a temperature range from 25° to 70° C., and to have a steep increase of resistance with the temperature. Said steep increase in the resistance within said temperature range causes a rapid decrease of the amount of heat generation, whereby the temperature self-control in said temperature range is rendered possible.

Preferably, said heat-generating member 13 has a volume resistivity at 25° C. ($\rho 25$) within a range of $9.8 \times 10^{-3}$–$2.97 \times 10^5$ $\Omega \cdot cm$, and that at 40° C. ($\rho 40$) within a range of $10^{-1}$–$10^5$ $\Omega \cdot cm$, and a ratio of volume resistivity at 70° C. to that at 25° C. ($\rho 70/\rho 25$) defined by a relation $5 \leq (\rho 70/\rho 25) \leq 400$.

These conditions allow to obtain a heat-generating member 13 capable of satisfying the heat generation in the low temperature range (70° C. or lower, preferably 50° C. or lower) and the temperature self-controlling ability. If the volume resistivity at 40° C. exceeds $10^5$ $\Omega \cdot cm$, it becomes difficult to elevate the temperature to the expected range within a short time unless the voltage is elevated. Also if the volume resistivity is lower than $10^{-1}$ $\Omega \cdot cm$, the use in the low temperature range, for example for toys, is not possible, since an expected temperature cannot be obtained unless a large current is given with an extremely small voltage.

The power source 10 is regulated at a predetermined voltage (0.8–50 V), utilizing various batteries or a commercial power supply.

Said power source 10 may be incorporated in the color variation inducing device for example by a dry battery detachably housed in the main body of said device, or may be provided outside said device and connected thereto.

The above-mentioned heat transmission member 4 and the heat-generating member 13 fixed at the back thereof are usually supported by a support member 5 and mounted on an end of the shaft 8.

Said heat-generating member 13 is preferably provided with electrodes in consideration of ease of wiring operation. Said electrodes can be formed on the mutually opposed faces of said heat-generating member 13 by molten aluminum injection, or by plating with nickel or tin. They may also be provided on the heat transmission member 4 to be in contact with said heat-generating member 13.

The heat transmission member 4 may be composed not only of a metal but also of a thin rubber, plastic or ceramic material, or formed as a coating of the above-mentioned material formed on the heat-generating member 13.

The above-mentioned heat transmission member 4 can be formed as a writing or coating tip (including a rotary member such as a ball), a stamp or a circular or polygonal shape according to the application, or as a toy element such as a comb for doll or a make-up article. In case said heat transmission member 4 is composed of metal, a portion thereof coming into contact with the thermally color-varying layer 121 may be treated with silicone resin or fluorinated resin for improving the slidability, or may be covered with a porous material with continuous pores and impregnated with water, in order to attain soft touch and smooth coating performance.

The electrodes may be provided on the mutually opposed faces of the heat-generating member 13, or one of the electrodes may be provided on the back of the heat-generating member 13 while the other may be provided on the front face of the heat transmission member 4.

In the following there will be given an explanation on the thermochromic material constituting the thermally color-varying layer 121 of the article 12, which is to be used in combination with the color variation inducing device of the present invention.

For this purpose there can be employed a thermochromic material containing a known thermochromic dye, such as liquid crystal, a three-component system consisting of an electron-donating color-developing organic compound, a color developer therefor and a compound inducing the color developing reaction between the two, or a thermochromic material containing the above-mentioned components in resinous solid solution, as disclosed in the U.S. Pat. Nos. 4,028,118, and 4,732,810. The above-mentioned materials show a small hysteresis ($\Delta H$) in the temperature-color density relationship, exhibiting color variation at a specified color variation point and showing, at the normal temperature range, only one of the states before and after said color variation, while the other state being present only during the application of heat or coldness while the state of the normal temperature range being restored when the application of such heat or coldness is terminated (cf. FIG. 26).

Also there can be effectively employed a system based on a thermally color-varying material, containing a color memorizing thermochromic dye, showing a large hysteresist in color variation, proposed by the present applicant in the U.S. Pat. No. 4,720,301. Said dye shows a large hysteresis ($\Delta H$) in color variation. In the plotting of color density as a function of temperature, the trajectory when the temperature is elevated from the low temperature side to the color varying temperature is significantly different from a trajectory when the temperature is lowered from the high temperature side to said color varying temperature (cf. FIG. 27).

Figure 27:
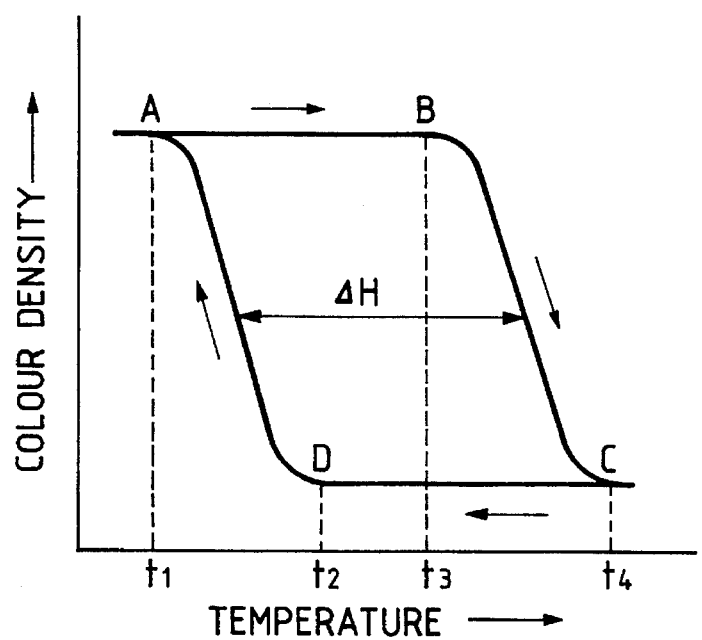
FIG. 27 is a color variation characteristic curve caused by temperature variation of a color memorizing thermochromic dye.

Referring to FIG. 27, said dye is completely colored below a point A (temperature t1). In the course of temperature elevation, substantial color change (discoloration) starts at a point B (temperature t3), and complete discoloration is reached beyond a point C (temperature t4), so that the color variation takes place within a temperature range between t1 and t4. A practical color-varying temperature range exists between t2 and t3. In this range the colored and uncolored states or the two different colored states can exist at the same time, with a large difference in color density, so that either of said two states can be selectively retained in the normal temperature range.

The thermochromic dye or the color-memorizing thermochromic dye mentioned above is normally included in microcapsules and dispersed in a medium containing binder, in the form of ink or paint, for forming a thermally color-varying layer on a substrate. Also said encapsulated dye can be blended in thermoplastic resin which can be molded in fused state into the thermally color-varying article 12 of various forms, effectively usable in combination with the color variation inducing device of the present invention.

Said thermally color-varying articles 12 include planar members, line-shaped members, molded members with irregular surfaces and any other articles provided on the surface thereof with a thermally color-varying layer 121 based on said thermally color-varying material, such as writing boards, teaching aids, studying materials, picture books, various display members and toys.

Effectively, the thermally color-varying layer 121 has the color varying point in a range from $-10°$ to $+70°$ C., preferably from $-5°$ C. to $+50°$ C.

[Function]

In the cooling device, when a DC current is applied from the N-terminal to the P-terminal under the application of a DC voltage of 0.1–50 V, the heat absorption and heat generation take place respectively at the upper and lower faces by the Peltier effect, whereby the heat absorbing side A and the heat generating side B are formed on the heat-conductive insulating plates 24 on both sides. The temperature of the heat absorbing side is lowered and maintained in a desired range by the function of the radiator 3.

Said radiator 3 is composed of a metal fin or a wound mesh sheet, and is regulated at a suitable heat resistance within a range of $0.1°–150°$ C./W, thereby exhibiting a desired radiating ability.

The dissipation of heat generated from the heat generating side B through the radiator 3 is based on the heat accumulation in the radiator 3 itself and the heat radiation from said radiator into the air. Immediately after the start of heat generation from the heat generating side B, the generated heat is mostly consumed for heating the radiator 3, so that the heat dissipation into the air is limited. Therefore the heat accumulating effect prevails. The amount of heat released into the air increases as the temperature of the radiator 3 increases, and the heat accumulating effect is no longer present when the temperature of the radiator 3 becomes constant. Thus, even if the ability of heat dissipation into the air is limited, the heat dissipation can be achieved by heat accumulation as long as the time from the start of heat generation is short.

In consideration of the foregoing, the radiator 3 consisting of a heat-radiating container 31 filled with a heat accumulating medium 32 mainly intends for increase in the heat accumulating ability. The above-mentioned structure improves the ability for absorbing heat generated from the heat generating side B of the electrothermal converter device 2 and satisfactorily functions as the radiator 3 for a short period.

Thus, an appropriate cooled temperature is transmitted to the heat transmission member 4, maintained in close contact with the heat absorbing side A. The color variation by heating is also possible by changing said heat absorbing side A to the heat generating side by polarity inversion.

In the heating element provided with the heat generating member 13, said member 13 generates heat under a voltage application. With the increase in temperature, the resistance increases steeply whereby the temperature increase is reduced, and self-control of temperature is achieved at a point where the generated heat matches the dissipated heat. The cooling or heating end of said color variation inducing device 1 is positioned in contact with or in the proximity of, or acts, through air blowing means, on the thermally color-varying article 12 bearing a surfacial thermally color-varying layer 121 thereon, thereby inducing a color variation therein.

A system, in which the thermally color-varying layer 121 contains a thermochromic dye with a small hysteresis ($\Delta H$) in color variation, shows two different color states across a color variation point, one of said states being present at the normal temperature region while the other state being present only during the application of heat or coldness and being shifted to the state at the normal temperature region once said application is removed.

On the other hand, a thermally color-varying layer 121 composed of a material containing the color-memorizing thermochromic dye shows a color change to a state different from the normal state by the application of heat higher than the higher color variation point or coldness below the lower color variation point and retains such different state in the normal temperature region even after such application of heat or coldness is terminated. Thus retained state can be changed to the original state by the application of thermal means inverse to that required for obtaining said different state, and thus restored original state can also be retained at the normal temperature region.

[Example 1]

Figure 2:
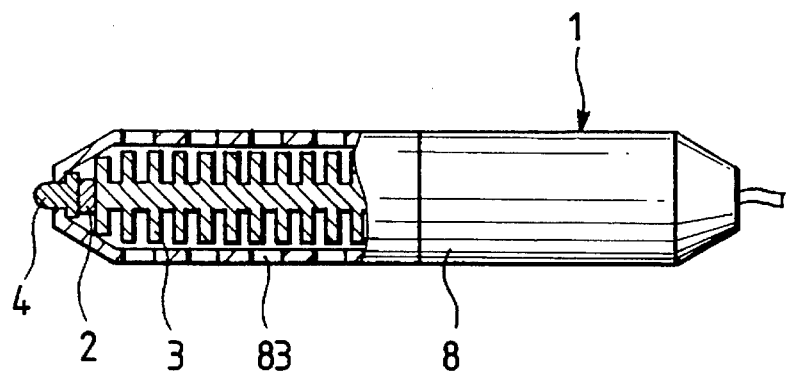
FIG. 2 shows an essential part of the color variation inducing device in FIG. 1 in partial cross-section.

(Color variation inducing device formed as a writing utensil: FIGS. 1 and 2)

An electrothermal converter device 2 (containing 11 pairs of semiconductor elements) was mounted in the front portion of a casing 8 having a plurality of heat radiating holes 83 around the circumference of the lateral wall and along a length of the wall also providing means to ensure a good grip around the casing. A metal heat transmission member 4 formed as a writing tip was positioned in close contact with an insulating plate 24 of the heat absorbing side A, while an aluminum diecast radiator 3 with a plurality of fins (heat resistance 18.3° C./W) was positioned in contact with an insulating plate 24 at the heat generating side B. The device 2 was connected, through lead wires, to a power supply unit 10, incorporating a DC power source (1.5 V), with a polarity inverting switch 11 for inverting the current direction. There was thus obtained a writing utensil 1 capable of applying coldness or heat.

Under the application of a voltage of 1.0 V and a current of 0.7 A at a room temperature of 19° C., said writing utensil 1 showed a maximum temperature of 32° C. at the heat generating side (reaching time about 3 minutes), a minimum temperature of −2° C. at the heat absorbing side (reaching time about 3 minutes), and an initial heat absorbing ability of 12° C. after 10 seconds.

A white sheet, provided on the entire area thereof with a thermally color-varying layer 121 composed of a material containing a color-memorizing thermochromic dye (reversible between colorless and black; lower color variation point t1 at 15° C. and higher color variation point t2 at 35° C.), when inscribed with the above-mentioned writing utensil in the white state at room temperature, showed color variation in the inscribed area, thereby exhibiting black writing. Said writing was retained in the room temperature from 17° to 35° C. Said sheet, when heated above 35° C., returned to white and could be used as a reusable writing board.

[Example 2]

Figure 3:
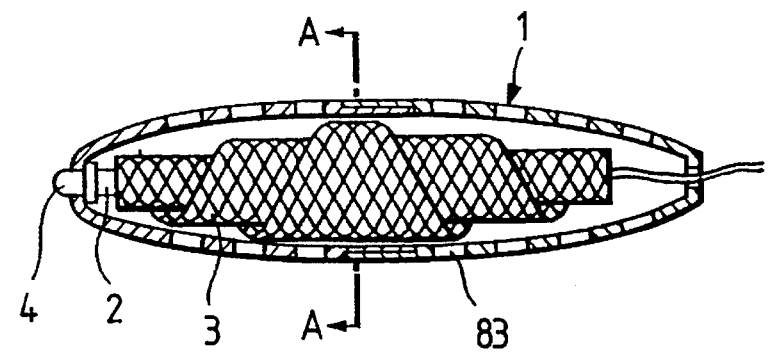
FIG. 3 is a longitudinal cross-section of another embodiment of the color variation inducing device of the invention.
Figure 4:
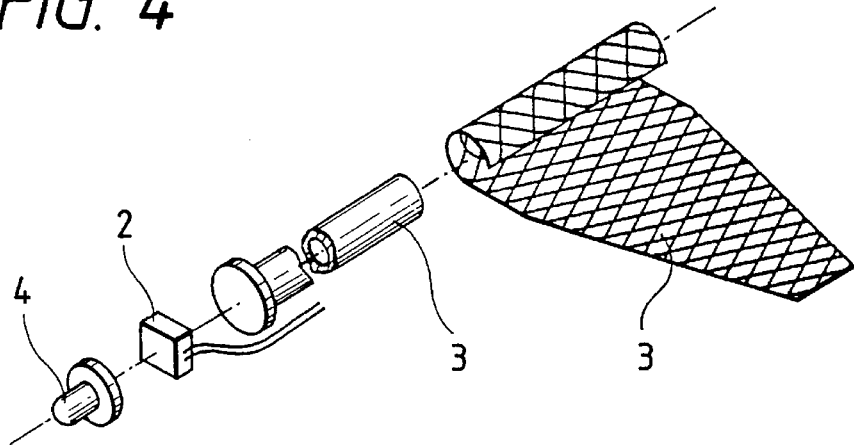
FIG. 4 is an exploded view of an essential portion of the color variation inducing device shown in FIG. 1.

(cf. FIGS. 3 and 4)

An electrothermal converter device 2 (containing 11 pairs of semiconductor elements) was mounted on the front portion of a shaft 8 having a plurality of heat radiating holes 83 on the lateral wall. A metal heat transmission member 4 formed as a writing tip was positioned in close contact with an insulating plate 24 at the heat absorbing side A, while a radiator 3 (heat resistance 19° C./W) composed of a heat radiating member consisting of an aluminum rod with a contact plane and an aluminum mesh sheet wound thereon was positioned in contact, at said contact plane, with an insulating plate 24 of the heat generating side B. The device 2 was connected, through lead wires, to an outside power supply unit 10 (a 1.5 V dry battery), with a polarity inverting switch 11 for switching the direction of current. Thus obtained was a color variation inducing device 1 capable of both heating and cooling.

Under the application of a voltage of 1.0 V and a current of 0.7 A at a room temperature of 18° C., said color variation inducing device 1 showed a maximum temperature of 32° C. (reaching time about 3 minutes), a minimum temperature of −3° C. (reaching time about 3 minutes, and a starting heat absorbing ability of 11° C. after 10 seconds.

[Example 3]

Figure 5:
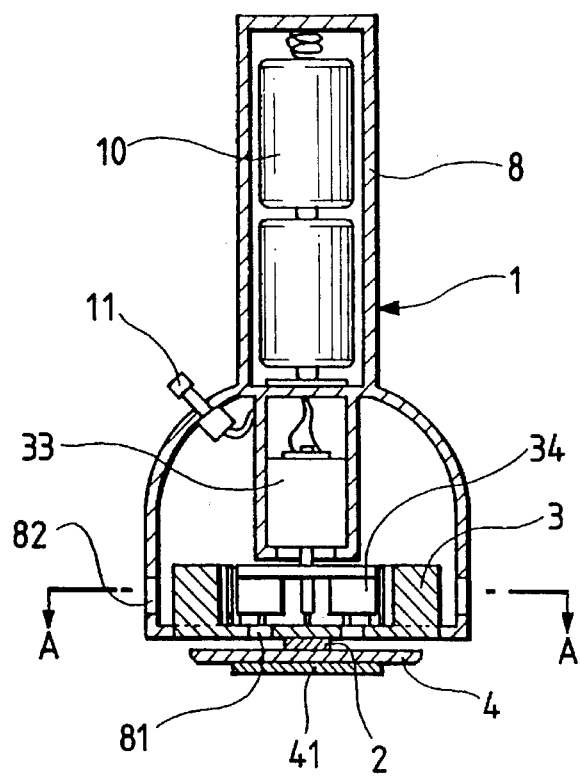
FIG. 5 is a longitudinal cross-section of another embodiment of the color varying inducing device of the invention.
Figure 6:
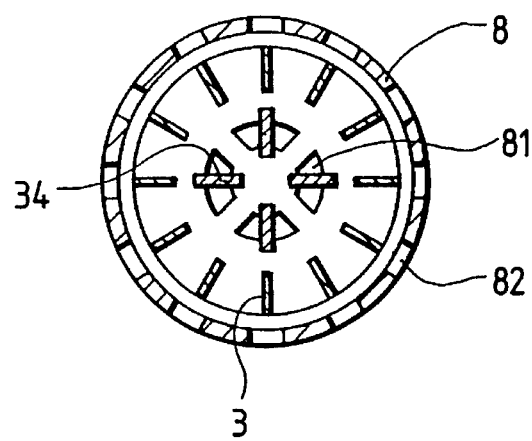
FIG. 6 is a cross-section taken along A—A in FIG. 5.

(Color variation inducing device formed as a stamp; FIGS. 5 and 6)

An electrothermal converting device (containing 18 pairs of semiconductor elements) was mounted on a lower end face of a plastic casing 8, in a larger diameter portion thereof. A heat transmission member 4 consisting of an aluminum disk was mounted on the heat absorbing end face A, and an aluminum radiator 3 with radial fins was mounted on the heat generating end face B. In the axial part of said radiator 3, there was rotatably provided a fan 34, connected to the shaft of a motor 33 fixed in the rear. In a handheld portion of the casing 8 a power supply unit 10 (two 1.5 V dry batteries) was provided to supply electric power, with switchable direction of current.

A stamp 1 was formed by detachably mounting, on said heat transmission member (disk) 4, a magnetic stamp plate 42 shaped as "A".

A thermally color-varying article 12, consisting of a white board provided on the entire surface thereof with a thermally color-varying layer 121 composed of a material containing a color-memorizing thermochromic dye (reversible between red and colorless state, with a lower color varying point t1 of 15° C. and a higher color varying point t2 of 35° C.), when stamped with said stamp device 1 (cooling for 5 minutes) showed a variation from the white state at the room temperature and exhibited a red character image "A". Also a red line appeared when a line was inscribed with said device 1 with said stamp plate 42.

Said character image "A" and line were retained under the room temperature condition of 17°–30° C. The sheet returned to the white state by heating above 35° C., and could be used as a reusable writing board.

[Example 4]

In a casing resembling an electric iron, on the internal upper front surface thereof, there was mounted a small DC motor with its output shaft downwards, on which fixed was a fan so as to blow air in the interior of said casing. A radiator 3 composed of an aluminum disk and having a plurality of radial standing fins was so mounted that said fins were positioned around said fan and an electrothermal converter device 2 (containing 17 pairs of semiconductor elements) was mounted with its heat generating side in contact with the lower face of said disk. A heat transmission member consisting of a thin aluminum disk (diameter ca. 3 cm) was fixed on the heat absorbing side of said device 2 and was exposed on the lower face of said casing.

[Example 5]

Figure 7:
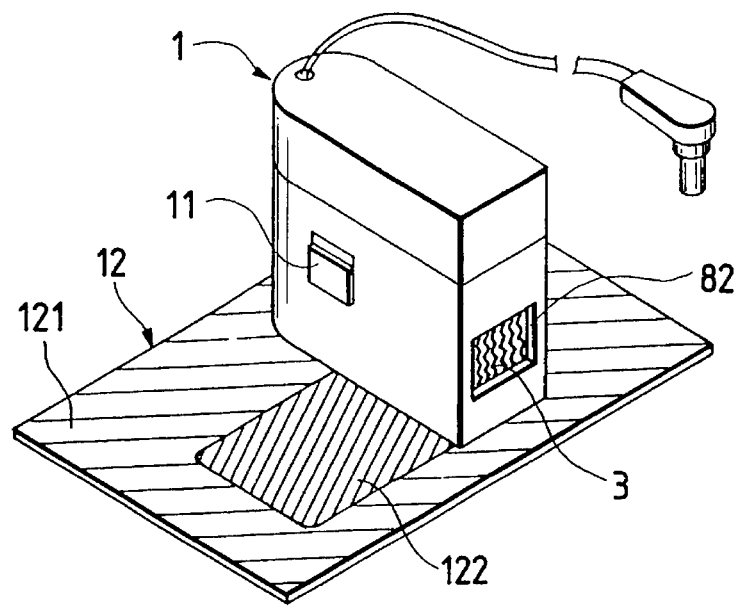
FIG. 7 is an explanatory view of another embodiment in the state of being used of the color variation inducing device according to the invention.
Figure 8:
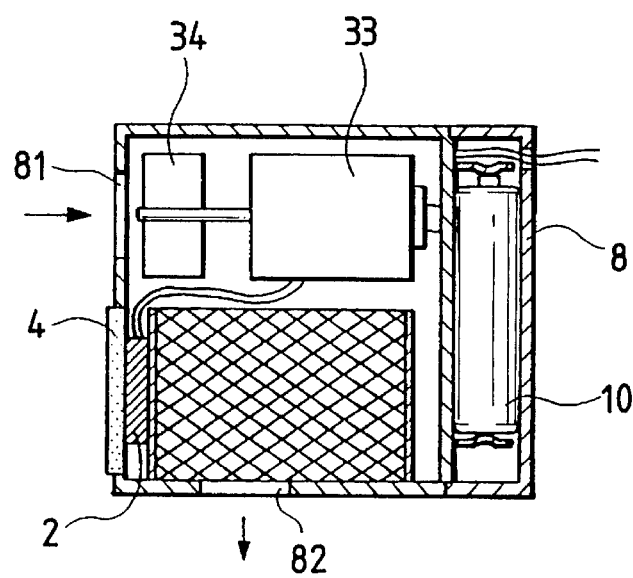
FIG. 8 is a cross-sectional explanatory view of the color variation inducing device in FIG. 7.

(cf. FIGS. 7 and 8)

In a plastic casing 8 with approximate external dimensions of 4 cm in length, 5 cm in width and 2 cm in height, a 1.5 V dry battery was housed at an end, and a fan connected to a small DC motor was mounted at the other end for air blowing, thereby cooling a radiator 3 (an aluminum mesh sheet folded into multiple layers) positioned at the side of said driving components. At the base of said radiator 3 there was mounted a heat radiating plate maintained in close contact with the heat generating side of an electrothermal converter device 2 (containing 17 pairs of semiconductor elements), and a heat transmission member 4 consisting of an aluminum plate is fixed to the heat absorbing side of said device 2 and is exposed to the exterior.

An exhaust hole 82 is provided on the lateral face of said casing 8, and a suction hole 81 is provided on said casing 8, at the side of the heat transmission member 4.

Under the application of a voltage of 0.8 V and a current of 1.3 A at room temperature of 23° C., the above-explained color variation inducing device 1 showed a maximum temperature of 29° C. at the heat generating side (reaching time about 2 minutes), a minimum temperature of 4° C. at the heat absorbing side (reaching time 3 seconds), a thermal resistance of 10.0° C./W in the radiator, and an initial heat absorbing ability of 13° C. after 20 seconds.

A thermally color-varying article 12 consisting of a white sheet provided on the entire surface thereof with a thermally color-varying layer 121 consisting of a material containing a color-memorizing thermochromic dye (reversible between black and colorless state; with a lower color varying point t1 of 15° C. and a higher color varying point t2 of 35° C.) and being white at room temperature, showed a black inscription when a line was drawn with the above-explained stamp. Said inscription was maintained in the room temperature of 17°–30° C. Said cooling device 1 can also be utilized as a heating device, by the inversion of the polarity of the applied current.

[Example 6]

Figure 9:
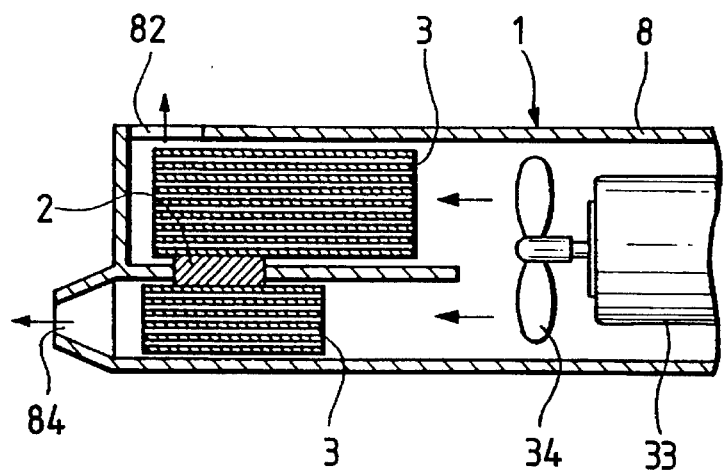
FIG. 9 is a longitudinal cross-section of another embodiment of the color variation inducing device of the invention.

(Color variation inducing device by cold or hot air blowing: cf. FIG. 9)

The front part of the interior of a plastic casing 8 of 30 mmΦ was divided by a partition into two spaces, one of which was provided at the front end with a cold air hole 84 for emitting the generated cold air while the other space was closed at the front end but was provided at the lateral wall of said casing 8 with an exhaust hole 82. In said partition there was mounted an electrothermal converter device 2 in such a manner that the heat absorbing side and the heat generating side thereof are respectively exposed in said divided spaces, and multi-layered radiators 3, composed of folded aluminum mesh sheets, are provided respectively in contact with said heat absorbing side and said heat generating side. An electric fan 34 was provided behind said radiators 3. Said device 2 was driven by an electric system including an AC/DC converter, and a selector switch 11 was provided in said system for the inversion of polarity.

[Example 7]

(Color variation inducing device by cold/hot air circulation: no illustration)

A cold air generating chamber (serving also as a hot air generating chamber by the inversion of polarity) and an air cooling chamber for accepting the cold air generated in said generating chamber were provided side by side on a base portion. The bottom of said air cooling chamber was composed of the ceiling of said base portion, and a cold air hole was formed in said ceiling. An air blowing chamber provided with an electric fan was provided on said air cooling chamber and was in communication with an air intake hole of the cold air generating chamber. In said cold air generating chamber there was provided an electrothermal converter device, with radiators (composed of a plurality of aluminum mesh sheets in laminated structure) maintained in contact with the heat generating side and the heat absorbing side of said device.

The lead wires of said electric fan were connected to a power source, consisting of four 1.5 V dry batteries.

In a lateral part of the casing there was mounted a plate member of transparent resin, in such a manner that the color variation of the thermally color-varying article to be accommodated in said casing could be observed from the outside.

A doll with a thermally color-varying clothing (colored with a material containing a color-memorizing thermochromic dye which was reversible between red and yellow colors, with a lower color varying point at 15° C. and a higher color varying point at 35° C.) was placed in the air cooling chamber of said device and cold air was applied. Said clothing varied from yellow to red after 5 minutes. The red color of the clothing was retained when the doll was taken out and left at the room temperature of 20° C. Said red color disappeared and the original yellow color was restored by heating above 35° C.

[Example 8]

Figure 10:
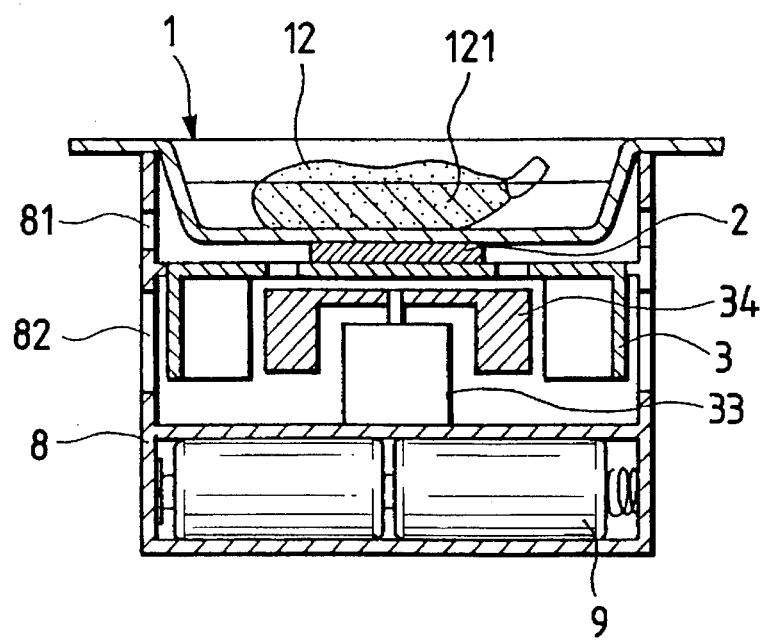
FIG. 10 is an explanatory view of another embodiment of the color variation inducing device of the present invention which is in the state of being used.
Figure 11:
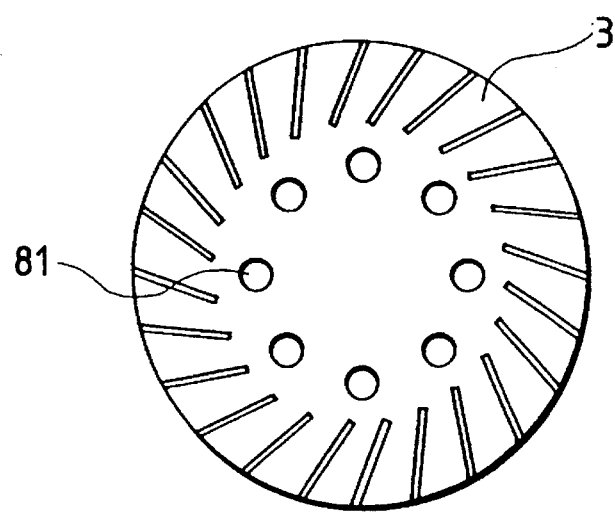
FIG. 11 is a plan view of a radiator adopted in the embodiment shown in FIG. 10.

(Color variation inducing device by water cooling: FIGS. 10 and 11)

In the lower part of a cylindrical casing 8 there was formed a partition, and a power supply unit 10 was housed in the space below said partition, and an electric fan 34 was mounted upwards on the upper face of said partition. An aluminum radiator 3 was mounted in such a manner that the heat radiating fins thereof were positioned around said electric fan 34 (cf. FIG. 11), and the base plate of said radiator 3 was fixed to the heat generating side of an electrothermal converter device 2. An aluminum container, formed as a cooking pan, was fixed on the heat absorbing side of said device 2. A thermally color-varying toy cooker was thus formed.

When cooling was conducted with a small amount of water, with a depth of several millimeters in said container, and a thermally color-varying plastic lobster (of which surface was colored with a material containing a color-memorizing thermochromic dye which was reversible between lobster color and red, with a lower color varying point at 10° C. and a higher color varying point at 30° C.) after about 5 minutes, the lobster varied to red color. Said red color was maintained in the room temperature of 25° C., but the original lobster color was restored by heating above 35° C.

[Example 9]

Figure 12:
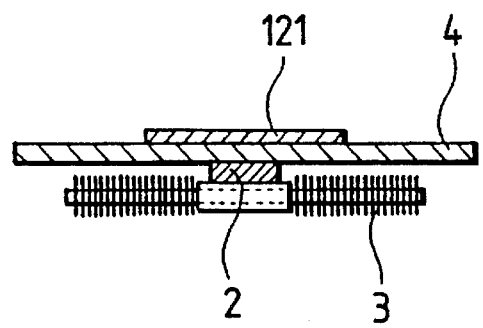
FIG. 12 is a longitudinal cross-sectional explanatory view of an essential portion of another embodiment of the color variation inducing device of the invention.

(Panel-shaped color variation inducing device: FIG. 12)

A flower pattern was printed with a material containing a color-memorizing thermochromic dye (reversible between red and yellow, with a lower color varying point at 10° C. and a higher color varying point at 30° C.) on a heat transmission member 4 consisting of an aluminum plate, of which rear face was adhered to the heat absorbing side of an electrothermal converter device 2, having a radiator with a plurality of fins at the heat generating side 3. Said device was driven by the application of a DC voltage of 6 V, and a selector switch 11 was further provided for inverting the polarity of said voltage, thereby interchanging the heat generating side and the heat absorbing side. An electric fan for air cooling of said fins may be suitably provided behind said radiator 3.

By the cooling with said color variation inducing device 1, the pattern which was yellow at the room temperature of 25° C. varied to red. Thus varied color was retained even after the termination of cooling. Said red color varied to yellow by heating with the heat absorbing side after polarity inversion, and thus varied color was retained at the room temperature.

[Example 10]

Figure 13:
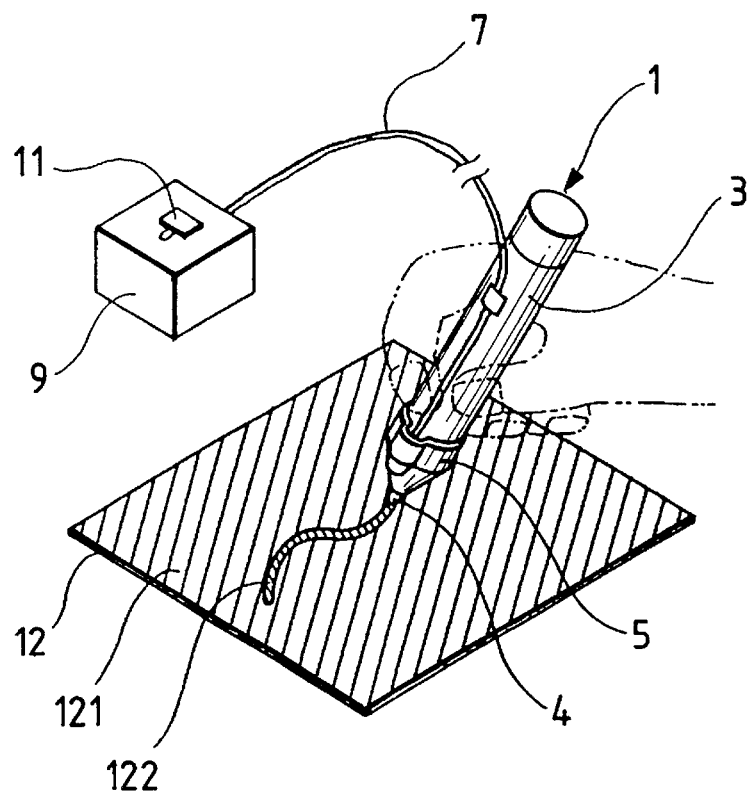
FIG. 13 is an explanatory view of another embodiment of the color variation inducing device of the invention which is in the state of being used.
Figure 14:
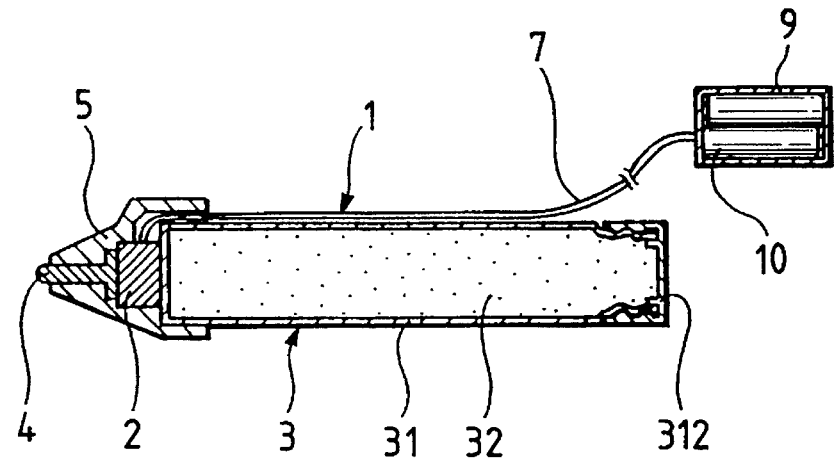
FIG. 14 is a cross-sectional explanatory view of a color variation inducing device shown in FIG. 13.

(cf. FIGS. 13 and 14)

In a central hole of a molded plastic support member 5, having said central hole and an enlarged hole communicating with said central hole and opening at the other end, an aluminum heat transmission member 4, formed as a pen tip and having an expanded plate portion at the other end, was mounted in such a manner that the tip portion was exposed to the exterior. A front end member was completed by adhering said expanded plate portion, with heat-conductive paste, to an insulating plate 24 of the heat absorbing side A of an electrothermal converter device 2 (containing 7 pairs of semiconductor elements) fitted into said enlarged opening. The bottom portion of a heat radiating container 31, consisting of an aluminum shaft (15 mm in diameter and 10 cm in length) was inserted into the enlarged opening of said support member 5 and adhered, with heat-conductive paste, to the insulating plate 24 of the heat generating side B of said device. Said aluminum shaft 31 is provided, at an aperture at the other end, with a detachably screwed stopper 312, and contained about 15 cc of water therein as heat accumulating medium 32, thereby constituting a radiator 3. Said electrothermal converter device 2 had lead wires 7 which were connected to an external power source unit 9 containing a 1.5 V dry battery, and a switch 11 was provided for controlling the power supply and switching the polarity thereof.

In the room temperature of 25° C., the temperature of the writing tip of the above-explained color variation inducing device 1 was ca. 18° C. after 10 seconds from the start of current supply, ca. 13° C. after 30 seconds, ca. 10° C. after 1 minute and ca. 4° C. after 2 minutes. Also when the polarity was inverted, the temperature of the writing tip at the room temperature of 25° C. was ca. 35° C. after 10 seconds from the start of power supply, ca. 40° C. after 15 seconds and ca. 60° C. after 30 seconds.

A thermally color-varying article 12 consisting of a white sheet provided on the entire surface thereof with a thermally color-varying layer 121 consisting of a material containing a color-memorizing thermochromic dye (reversible between black and colorless state; with a lower color varying point t1 of 15° C. and a higher color varying point t2 of 35° C.) and being white at room temperature, showed a black inscription when a line was drawn with the above-explained color variation inducing device 1 (by cooling). Said inscription was retained in the room temperature of 17°–30° C. The black inscription disappeared when said sheet was heated above 35° C., and the entirely white writing board was restored and could be used repeatedly.

[Example 11]

A radiator 3 was formed by filling water as the heat accumulating medium 32 in a heat radiating container 31 consisting of a plastic shaft and a heat-conductive metal lid hermetically fitted in an end aperture of said shaft. A color variation inducing device was obtained by mounting said radiator 3 into a front end member of the example 10, containing the heat transmission member 4 and the electrothermal converter device 2 in the support member 5.

[Example 12]

A color variation inducing device was formed in the same manner as in the example 10, except for employing a heat radiating container (shaft) 31 with axial irregularities on the external surface and mounting a coil-shaped heat-radiating metal member on the bottom face of said shaft at the heat generating side.

[Example 13]

A color variation inducing device, formed as a miniature iron was formed by attaching a battery container unit to the lateral part of a heat radiating aluminum container provided therein with a space for holding water as the heat accumulating medium, mounting a handle on said container, positioning two electrothermal converter devices, with a suitable mutual distance, on the bottom of said container, connecting said devices with the power source (two 1.5 V dry batteries), contacting a heat transmission member, composed of a thin metal plate, with an insulation plate of the heat absorbing side A of said devices 2 and mounting said member to the bottom of said container by means of a heat insulation material.

[Example 14]

A stamp-formed color variation inducing device was formed in the same manner as in the example 10, by mounting a flat heat transmission member 4, composed of a metal plate, in the front aperture of the support member 5 in such a manner that the front end of said heat transmission member 4 is exposed to the exterior, and positioning the electrothermal converter device 2 and the radiator 3 as in the example 10.

[Example 15]

Figure 15:
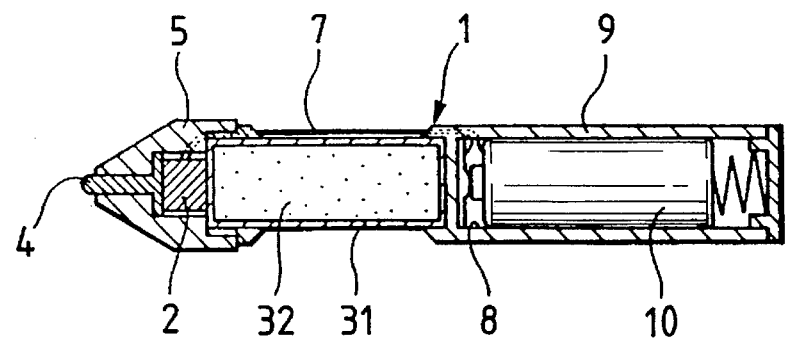
FIG. 15 is a longitudinal explanatory view of another embodiment of the color variation inducing device of the invention.

(cf. FIG. 15)

A radiator 3 was composed of a heat radiating container 31 (aluminum shaft) filled therein with water as the heat accumulating medium 32. A color variation inducing device 1 was formed by fitting said radiator 3 and a battery 10 in a plastic cover member, provided on the periphery thereof with four heat-radiating apertures with suitable distances, in such a manner that said radiator 3 is positioned at said apertures, and mounting said cover member on a front end member same as in the example 10.

[Example 16]

Figure 16:
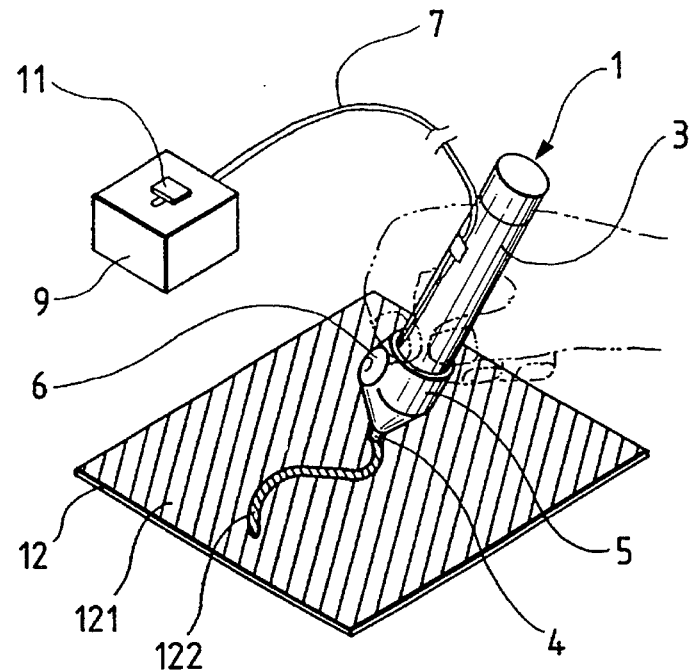
FIG. 16 is an explanatory view of another embodiment of the color variation inducing device according to the invention, which is in the state of being used.
Figure 17:
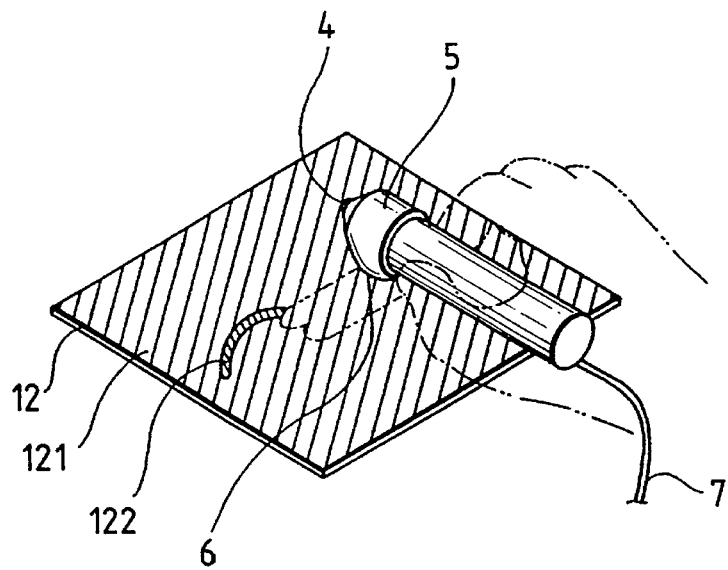
FIG. 17 is an explanatory view of another embodiment of the color variation inducing device according to the invention which is in the state of being used.
Figure 18:
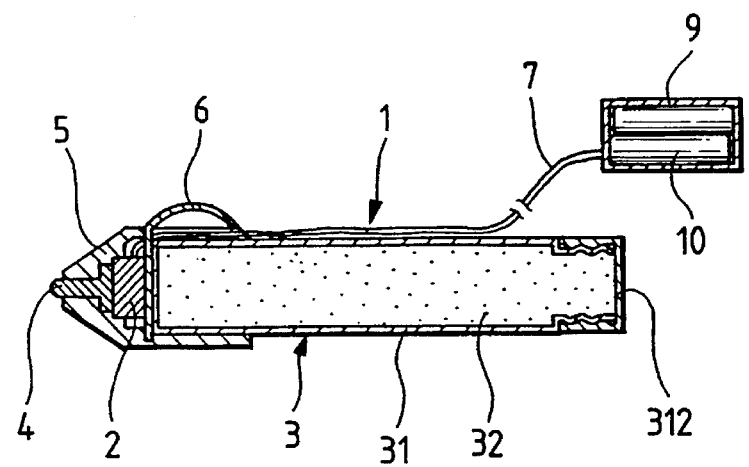
FIG. 18 is a longitudinal cross-sectional explanatory view of the color variation inducing device shown in FIG. 16.

(FIGS. 16 to 18)

In a central hole of a molded plastic support member 5', having said central hole and an enlarged hole communicating with said central hole and opening at the other end, a heat transmitting aluminum member 4, formed as a pen tip and having an expanded plate portion at the end, was mounted in such a manner that the tip portion was exposed to the exterior. A front end member was completed by adhering said expanded plate portion to an insulating plate 24 of the heat absorbing side A of an electrothermal converter device 2 (containing 7 pairs of semiconductor elements) fitted into said enlarged opening, and contacting the insulating plate 24 at the heat generating side B with a contact face of a heat-conducting protruding piece 6 (having said contact face and a bowl-shaped protruding piece connected to said contact face) in such a manner that said protruding piece protrudes on the lateral face of said support member 5. Into the enlarged opening of said support member 5, there was inserted a heat-radiating container 31 consisting of an aluminum shaft (15 mm in diameter and 10 cm in length), with the front face thereof in contact with the contact face of said heat-conductive protruding piece 6.

Said aluminum shaft 31 is provided, at an aperture at the other end, with a detachably screwed stopper 312, and contained about 15 cc of water therein as heat accumulating medium 32, thereby constituting a radiator 3. Said electrothermal converter device 2 had lead wires 7 which were connected to an external power source 9 containing a 1.5 V dry battery, and a switch 11 was provided for controlling the power supply and switching the polarity thereof.

At a room temperature of 25° C., the heat transmission member 4 of the above-explained color variation inducing device 1 reached ca. 7° C. after 30 seconds from the start of power supply, and the bowl-shaped protruding piece of the heat transmitting protruding piece 6 showed a surface temperature of ca. 45° C.

A thermally color-varying article 12 consisting of a white sheet provided on the entire surface thereof with a thermally color-varying layer 121 consisting of a material containing a color-memorizing thermochromic dye (reversible between black and colorless state; with a lower color varying point t1 at 15° C. and a higher color varying point t2 at 35° C.) and being white at room temperature, showed a black inscription in an area contacted by said heat transmitting member 4.

Said black inscription was retained at the room temperature of 17°–33° C., but was erased by the contact of said heat transmitting protruding piece 6 (bowl-shaped protruding piece), and the restored white writing board could be used repeatedly.

[Example 17]

Figure 19:
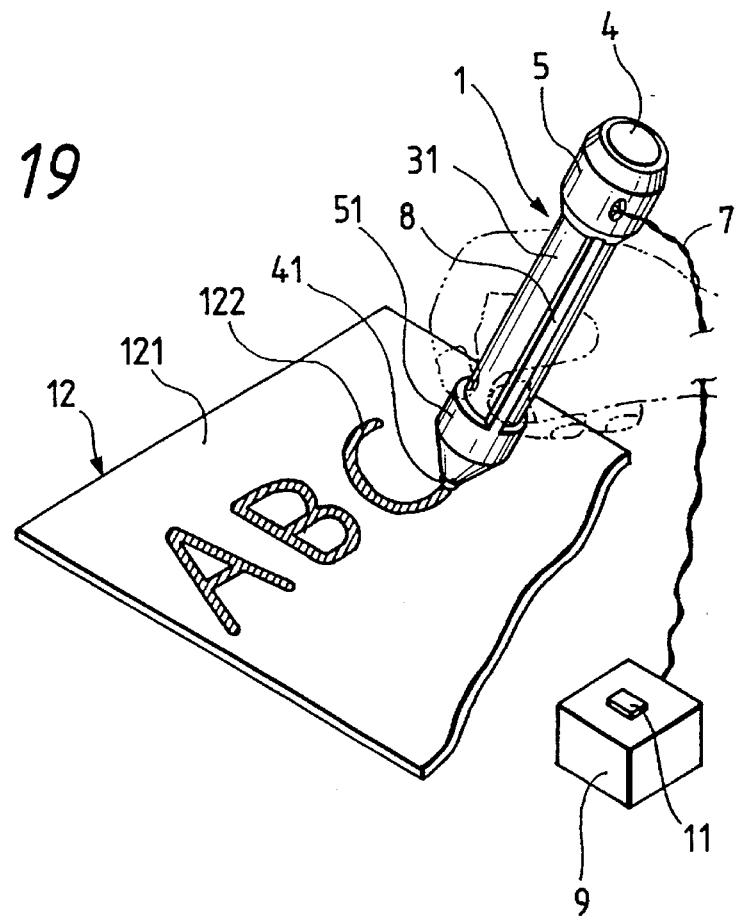
FIG. 19 is an explanatory view of another embodiment of the color variation inducing device according to the invention, which is in the state of being used.
Figure 20:
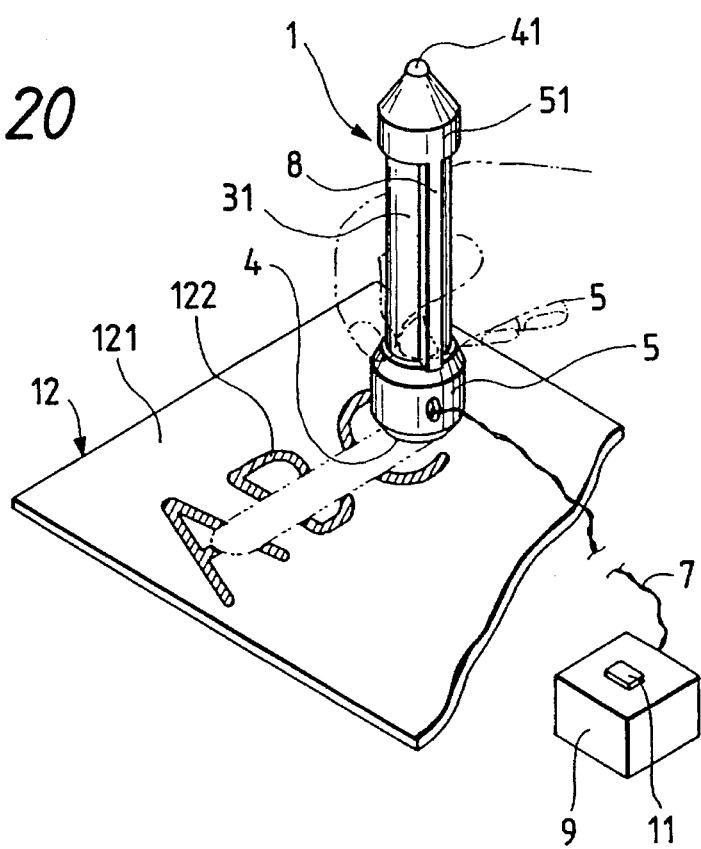
FIG. 20 is an explanatory view of another embodiment of the color variation inducing device according to the invention, which is in the state of being used.
Figure 21:
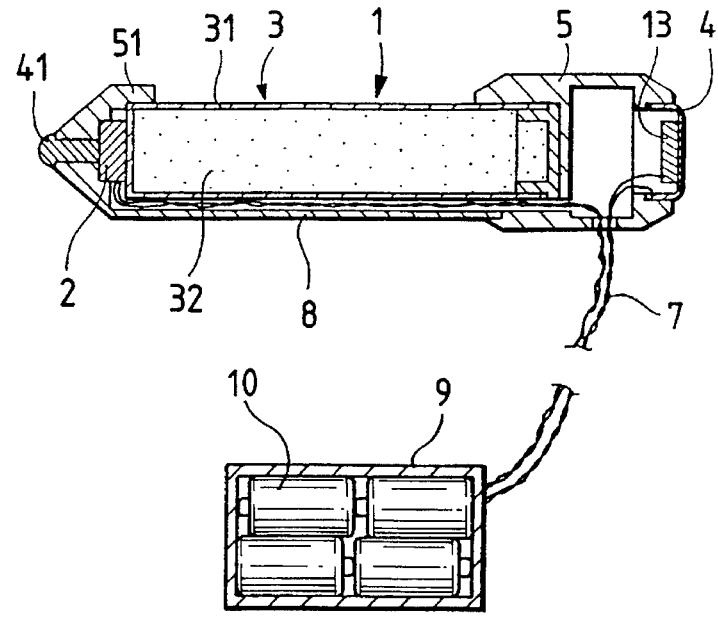
FIG. 21 is a cross-sectional explanatory view of another embodiment of the color variation inducing device according to the invention.
Figure 22:
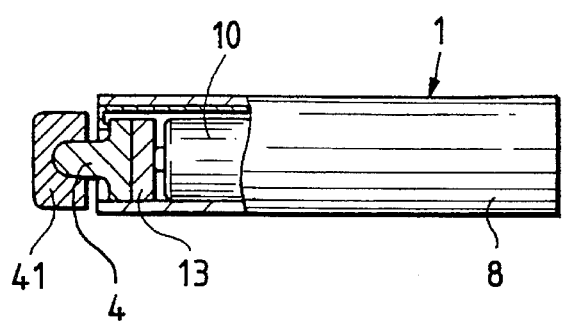
FIG. 22 is a partially cross-sectional explanatory view of another color variation inducing device of heating type.

(cf. FIGS. 19–21)

A heat generating element was formed by adhering, with conductive adhesive, a heat generating member 13 composed of sintered BaTiO$_3$ (15 mmΦ×1 mm in thickness; having conductive plated layers on both sides, having a resistance of 2.5• at 25° C. and a heating saturation temperature of 45° C.) on the internal bottom of a short aluminum tube closed at an end and constituting a heat transmission member 4. Lead wires respectively connected with said heat generating member 13 and the internal wall of said short tube are connected to an external power source consisting of four 1.5 V dry batteries.

Said heating element is mounted in a plastic support member 5, with said sealed bottom protruding from said member, which was in turn mounted on an end of a shaft 8, thereby constituting a color variation inducing device by heating.

A cooling element was prepared in the following manner.

A molded plastic support member 5, provided with a central hole and an enlarged hole communicating with said central hole and opening at the other end, was prepared. A heat transmitting aluminum member 41 was inserted into said central hole, and a rear end face of said member 41 was adhered to an insulating plate 24 at the heat absorbing side A of an electrothermal converter device 2 (containing 7 pairs of semiconductor elements) fitted in said enlarged hole.

Lead wires 7 were connected to said device 2 for connection with a power source 10.

The bottom portion of a radiator 3, consisting of an aluminum shaft 8 (15 mmΦ in diameter and 10 cm in length) containing about 5 cc of water as the heat accumulating medium 32 was inserted into the enlarged hole of said support member 51 and was fixed to the insulation plate 24 of the heat generating side B.

When an inscription was made with the heat transmission member 4 (cooling side) of the color variation inducing device 1 of this example, on a thermally color-varying article 12 consisting of a white sheet provided on the entire surface thereof with a thermally color-varying layer 121, composed of a material containing a color-memorizing thermochromic dye (reversible between black and colorless state; with a lower color varying point t1 at 15° C. and a higher color varying point t2 at 35° C.) and being white at room temperature, the contacted area varied from white state and showed a black inscription (thermochromic image 122). Said inscription was retained in the room temperature of 17°–30° C. (cf. FIG. 19).

Said black inscription was erased by contact of the heat transmission member 4 (heating side), heated to ca. 40° C., of the device 1 of the present example (cf. FIG. 20).

[Example 18]

A color variation inducing device 1 by heating was formed by positioning, in a front end aperture of a plastic shaft 8, an integrated heating element consisting of a heat transmission member 6 having a pen tip portion protruding from the center of a flat portion and a heat generating member 7 composed of sintered BaTiO$_3$ (15 mmΦ×1 mm in thickness; having conductive plated layers on both sides, having a resistance of 2Ω at 25° C. and a heating saturation temperature of 45° C.) adhered with conductive adhesive to the back of said flat portion, and positioning two 1.5 V dry batteries in series so as to effect power supply through an electrode provided in the flat portion of the heat transmission member 6 and a conductive member. A power switch (not shown) was provided at a suitable position.

At room temperature of 25° C., the pen tip of the color variation inducing device 1 reached a temperature of ca. 45° C. after 30 seconds from the start of power supply.

[Example 19]

(FIG. 22)

A color variation inducing device 1, capable of forming a wide inscription, was formed by fitting a heat transmitting front end metal member 41 on the front end of the device of the example 18.

Figure 23:
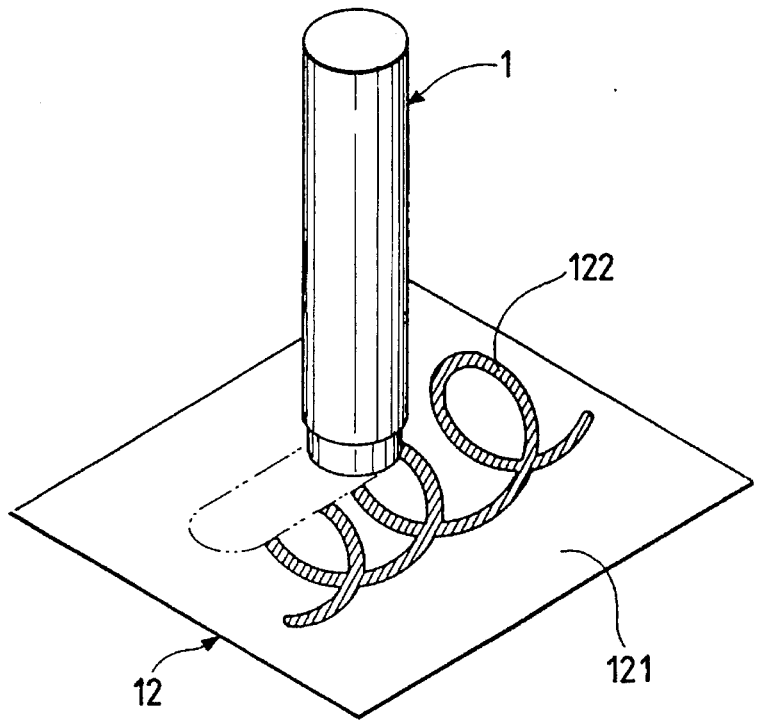
FIG. 23 is an explanatory view showing a state where writings formed by a cooling type color variation inducing device are erased by the heating type color variation inducing device shown in FIG. 22.

When an inscription was made with the cooling device 1 of the example 15 on a thermally color-varying article 12 consisting of a white sheet provided on the entire surface thereof with a thermally color-varying layer 121, composed of a material containing a color-memorizing thermochromic dye (reversible between black and colorless state; with a lower color varying point t1 at 15° C. and a higher color varying point t2 at 35° C.) and being white at room temperature, the contacted area varied from white state and showed a black inscription (thermochromic image 122). Said inscription was retained at room temperature of 17°–30° C. Said black inscription was erased by inscription with the heating device 1 of the example 19, of which tip portion was heated to ca. 40° C. (cf. FIG. 23).

The color variation inducing device of the present invention is employed in combination with a thermally color-varying article provided with a thermally color-varying layer, and constitutes cooling means capable of effectively exploiting the function in particular of such article having the color varying point in a low temperature region. In comparison with the conventional cooling means employing cold water or ice pieces as the cooling medium, the device of the present invention allows to induce color variation by cooling in such article, in easy and immediate manner at arbitrary time and location, and also provides portability and applicability to an article not resistant to water.

Furthermore there is provided a color variation inducing device capable of both cooling and heating, by the switching of polarity of power supply. Still effective function can be achieved with a low applied voltage not exceeding 50 V, so that there is no danger of current leakage. Also the function can be continued by the replacement of the power source batteries.

Furthermore, the color variation inducing device of the present invention may be used, together with a heating device provided with an electric heat-generating member rapidly self controlled to a desired saturation temperature under the application of a low voltage, in combination with various thermally color-varying articles, thereby effectively obtaining color-varying effect.

It can particularly be employed in combination with a system having a thermally color-varying layer, composed of a material containing a color-memorizing thermochromic dye (showing a large hysteresis in color variation with two color varying points at the higher and lower temperature sides; reversibly variable between colorless and colored states or between two different colored states; being converted to a state different from the normal state by the application of coldness below the said lower color-varying point or heat above said higher color-varying point; and capable of maintaining said different state at the normal temperature range), thereby effectively exploiting the function of such color-memorizing thermochromic dye and enabling diversification of merchandise and applications to various fields.

What is claimed is:

1. A color variation inducing device, comprising:
   an electrothermal converter device having a unit structure in which P-semiconductor elements and N-semiconductor elements are connected alternately with metal pieces and upper and lower faces of said elements are sandwiched between heat conductive electrically insulating plates, thereby providing the electrothermal converter device with a heat absorbing portion and a heat generating portion based on Peltier effect;
   a radiator connected to the heat generating side of said electrothermal converter device, said radiator having a heat radiating ability within a range of $0.1°$ to $150°$ C./Watt capable of inducing color variation in a thermally color-varying layer of a thermally color varying article by being placed in contact or in proximity of said color-varying layer;
   a casing for housing and supporting therein said electrothermal converter device and completely encompassing said radiator, the casing having a lateral wall defining a circumferential gripping area around said electrothermal converter device provided with a plurality of heat radiating holes covering a length and circumference of said gripping area thereby defining means sufficient to ensure that the casing is manually graspable during use;
   wherein said electrothermal converter device is rendered functionable under the application of a DC voltage in such a manner that the heat absorbing side thereof exhibits a temperature reduction of at least $3°$ C. with respect to the ambient temperature, within an ambient temperature range from $10°$ to $35°$ C.

2. A device according to claim 1, wherein said electrothermal converter device has a unit structure in which P-semiconductor elements and N-semiconductor elements connected alternately with metal pieces and upper and lower faces of said elements are sandwiched between heat-conductive insulating plates.

3. A device according to claim 1, capable of both cooling and heating by inverting said heat absorbing side and said heat generating side, by the inversion of polarity of the DC current supplied to said electrothermal converter device.

4. A device according to claim 1, formed as a writing utensil in which said casing is a shaft and a writing tip member is provided on the heat absorbing side of said electrothermal converter device.

5. A device according to claim 1, wherein said radiator is connected to the heat generating side across a heat-transmitting protruding piece.

6. A device according to claim 5, wherein said heat-transmitting protruding piece serves as a heating tip member.

7. A color variation inducing device according to claim 1, in combination with a thermally color-varying article of which the thermally color-varying layer is composed of a material containing a color-memorizing thermochromic dye, which shows a large hysteresis in temperature change, is reversibly variable between colored and uncolored states or between two different colored states, and is capable of selectively retaining either of said states at the normal temperature region.

8. A color variation inducing device according to claim 7 in which said thermally color-varying article is formed as a sheet or a plate member.

* * * * *

UNITED STATES PATENT AND TRADEMARK OFFICE
CERTIFICATE OF CORRECTION

PATENT NO. : 5,502,967
DATED : April 2, 1996
INVENTOR(S) : TANEHIRO NAKAGAWA ET AL.   Page 1 of 4

It is certified that error appears in the above-identified patent and that said Letters Patent is hereby corrected as shown below:

On title page,

AT [56] REFERENCES CITED

Foreign Patent Documents, insert
```
--8810139  12/1988  PCT
  100715    2/1984  Eur. Pat. Off.
  382241    8/1990  Eur. Pat. Off.
  2066089   7/1981  United Kingdom
  2205255  12/1988  United Kingdom
  7225955   7/1972  Japan
  1389801   4/1988  U.S.S.R.--.
```

U.S. Patent Documents, insert
--5,136,850  8/1992  Bierschenk et al. ...  62/3.62--.

Other Publications, insert
--Patent Abstracts of Japan, vol. 7, No. 245
 (Oct. 29, 1983) P-233.
 Patent Abstracts of Japan, vol. 15, No. 187
 (May 14, 1991) E-1067.--.

On drawing,

SHEET 10 OF 10

Figure 26:
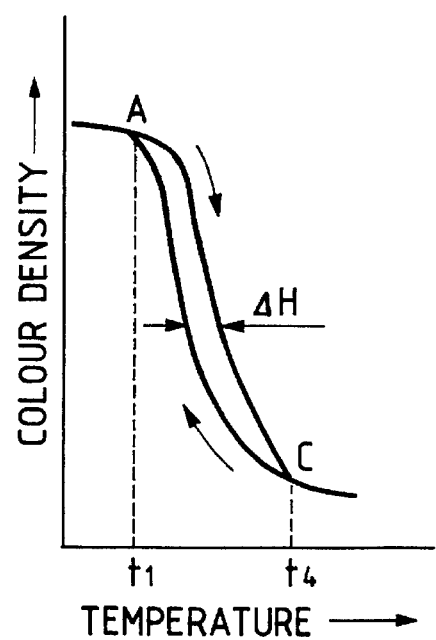
FIG. 26 is a color variation characteristic curve caused by temperature variation of a heat sensitive color variation of a heat sensitive color varying or thermochromic dye.

FIG. 26, "COLOUR" should read --COLOR--.
FIG. 27, "COLOUR" should read --COLOR--.

COLUMN 2

Line 34, "varying" should read --variation--.

UNITED STATES PATENT AND TRADEMARK OFFICE
CERTIFICATE OF CORRECTION

PATENT NO. : 5,502,967
DATED : April 2, 1996
INVENTOR(S) : TANEHIRO NAKAGAWA ET AL.

It is certified that error appears in the above-identified patent and that said Letters Patent is hereby corrected as shown below:

COLUMN 3

Line 19, "view" should read --view of--.

COLUMN 4

Line 17, "resistance less" should read --resistance and a system with a heat resistance--.
Line 38, "Celcius," should read --Celsius,--.

COLUMN 5

Line 62, "capable" should read --capable of--.

COLUMN 6

Line 5, "power" should read --powder--.

COLUMN 7

Line 35, "hysteresist" should read --hysteresis--.

COLUMN 8

Line 39, "intends" should read --intended--.

COLUMN 9

Line 10, "Thus" should read --This--.
Line 31, "10," should read --9,--.

UNITED STATES PATENT AND TRADEMARK OFFICE
CERTIFICATE OF CORRECTION

PATENT NO. : 5,502,967
DATED : April 2, 1996
INVENTOR(S) : TANEHIRO NAKAGAWA ET AL.

It is certified that error appears in the above-identified patent and that said Letters Patent is hereby corrected as shown below:

COLUMN 10

Line 2, "unit 10" should read --unit 9--.
Line 10, "3 minutes," should read --3 minutes),--.
Line 32, "42" should read --41--.
Line 44, "plate 42." should read --plate 41.--.

COLUMN 11

Line 45, "mmΦ" should read --mm$\phi$--.

COLUMN 12

Line 36, "unit 10" should read --unit 9--.

COLUMN 15

Line 45, "(15 mmΦ" should read --(15 mm$\phi$--.
Line 47, "2.5•" should read --2.5 $\Omega$--.

COLUMN 16

Line 4, "(15 mmΦ" should read --(15 mm$\phi$--.
Line 33, "(15 mmΦ" should read --(15 mm$\phi$--.

COLUMN 17

Line 23, "self controlled" should read --self-controlled--.

UNITED STATES PATENT AND TRADEMARK OFFICE
CERTIFICATE OF CORRECTION

PATENT NO. : 5,502,967
DATED : April 2, 1996
INVENTOR(S) : TANEHIRO NAKAGAWA ET AL.   Page 4 of 4

It is certified that error appears in the above-identified patent and that said Letters Patent is hereby corrected as shown below:

<u>COLUMN 18</u>

Line 4, "layer;" should read --layer; and--.

Signed and Sealed this

Tenth Day of September, 1996

Attest:

BRUCE LEHMAN

Attesting Officer    Commissioner of Patents and Trademarks